(12) United States Patent
Helm

(10) Patent No.: US 7,954,623 B2
(45) Date of Patent: Jun. 7, 2011

(54) METHOD AND DEVICE FOR THE MONITORED CONVEYING OF SHEET METAL PLATES

(75) Inventor: Wolfgang Helm, Bensheim (DE)

(73) Assignee: Pepperl + Fuchs GmbH, Mannheim (DE)

( * ) Notice: Subject to any disclaimer, the term of this patent is extended or adjusted under 35 U.S.C. 154(b) by 403 days.

(21) Appl. No.: 12/302,347

(22) PCT Filed: Mar. 23, 2007

(86) PCT No.: PCT/EP2007/002602
§ 371 (c)(1),
(2), (4) Date: Nov. 25, 2008

(87) PCT Pub. No.: WO2007/137643
PCT Pub. Date: Dec. 6, 2007

(65) Prior Publication Data
US 2010/0236894 A1    Sep. 23, 2010

(30) Foreign Application Priority Data

May 31, 2006  (DE) .......................... 10 2006 025 387

(51) Int. Cl.
*B65G 29/00* (2006.01)
(52) U.S. Cl. ............... 198/468.4; 198/464.1; 414/796.9; 414/796.5; 271/260
(58) Field of Classification Search ............... 198/460.1, 198/437, 468.4, 464.1; 414/796.5, 796.9, 414/797; 901/35, 40; 271/3.09, 3.17, 260, 271/262, 259, 265.04
See application file for complete search history.

(56) References Cited

U.S. PATENT DOCUMENTS

| 4,936,566 A | * | 6/1990 | Hiramatsu | 414/797 |
| 5,284,334 A | * | 2/1994 | Yamamoto | 414/797 |
| 6,006,638 A | * | 12/1999 | Eltringham | 414/797 |
| 6,468,025 B1 | * | 10/2002 | Stumpf et al. | 414/797 |
| 7,021,887 B2 | * | 4/2006 | Hoe et al. | 414/796.6 |
| 7,792,609 B2 | * | 9/2010 | Strasser et al. | 700/258 |

FOREIGN PATENT DOCUMENTS

| DE | 35 05 671 A1 | 8/1986 |
| DE | 43 22 963 A1 | 2/1995 |
| DE | 692 04 410 T2 | 4/1996 |
| DE | 200 18 193 U 1 | 2/2001 |
| JP | 58078935 | 5/1983 |
| JP | 07053095 | 2/1995 |
| JP | 10293012 A | 11/1998 |
| WO | WO 2007/137643 A1 | 12/2007 |

* cited by examiner

*Primary Examiner* — James R Bidwell
(74) *Attorney, Agent, or Firm* — John A. Merecki; Hoffman Warnick LLC

(57) ABSTRACT

The invention relates to a method for the monitored conveying of sheet metal plates, particularly into a working or forming plant, in which a plate is taken up by a feeder from a first position and the plate and feeder are moved to a second position. According to the invention, during feeder movement to the second position a first sensor element located at the feeder, as well as a second sensor element located in the second position, are brought into a signal-based arrangement, and that on the basis of a measurement signal transmitted between the sensor elements the number of plates at the feeder and/or the second position is determined. The invention also relates to a device for the monitored conveying of plates, particularly into a forming plant.

20 Claims, 4 Drawing Sheets

METHOD AND DEVICE FOR THE MONITORED CONVEYING OF SHEET METAL PLATES

Figure 1:
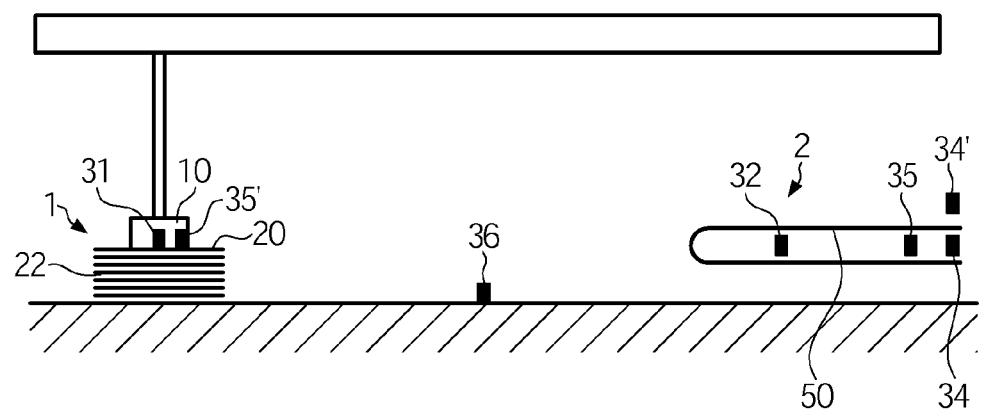

The invention relates to a method for the monitored conveying of sheet metal plates, particularly into a forming or working plant, according to the preamble of claim 1. In such a method a plate is taken up from a first position by a feeder and the plate is moved by the feeder to a second position.

The invention also relates to a device for the monitored conveying of sheet metal plates, particularly into a working or forming plant, according to the preamble of claim 8. Such a device is equipped with a movable feeder by means of which a plate can be conveyed from a first position to a second position and can preferably be deposited there.

Such a method and such a device are e.g. known from DE 43 22 963 A1. This document teaches in the case of plate-processing machines to raise plates with a feeder having a suction device from a plate stack and supply the same to a working machine. Here, under certain circumstances it can arise that two or more plates adhere to one another. If such a plate stack of two or more plates enters the working machine, the tool can be damaged. To prevent this, DE 43 22 963 A1 teaches the performing of a double plate control. For this purpose a determination of the weight of the plate removed from the stack is carried out during conveying.

DE 35 05 671 A1 discloses a measuring method and a measuring arrangement, in which double plate layers are detected by determining the inductance of an electromagnet.

A further double plate detection device is known from JP 10-293012 A. In the case of this known device in the vicinity of the plate stack a frame on which is located a light barrier is provided. On raising the plates they are passed through the light barrier, the plate thickness being detected by the light barrier.

DE 692 04 410 T2 discloses a device and a method for feeding semifinished parts from a stack to a forming machine. Said device has a detection mechanism for detecting a change in the position or geometry of the stack.

The object of the invention is to provide a method and a device for the monitored conveying of plates, particularly into a forming plant, which ensure particularly high reliability and operating safety.

According to the invention this object is achieved by a method having the features of claim 1 and a device having the features of claim 8. Preferred embodiments are given in the in each case dependent claims.

The inventive method is characterized in that during the movement of the feeder to the second position a first sensor element located on the feeder, as well as a second sensor element located in the second position are brought into a signal-based arrangement, and that on the basis of a measurement signal transmitted between the sensor elements the number of plates at the feeder and/or at the second position is determined.

It is a fundamental idea of the invention that for determining the number of plates at the feeder and/or the second position, there is a measurement section formed by two sensor elements. One sensor element is mounted on the movable feeder and the second sensor element is fixed relative to the machine bed. Such an arrangement makes it possible to place the sensor elements close to the plate conveying path, accompanied by a comparatively simple structure, so that a particularly high measuring accuracy is ensured. By placing one of the two sensor elements on the travelling feeder, it is also possible to counteract the risk of the feeder colliding with a sensor element. This more particularly applies in the case where, e.g. as a result of a change to the shape of the plates, a modification of the feeder displacement path is necessary. Thus, the inventive method ensures a particularly high operating reliability and safety.

According to the invention the two sensor elements are then in a signal-based arrangement allowing a plate number determination when the feeder has moved to the second position. With the signal-based arrangement the two sensor elements are appropriately superimposed.

Plate number determination is, according to the invention, performed when the feeder is in the second position. If the feeder has moved out of the second position, it is consequently possible for the two sensor elements to be outside the signal range thereof.

The inventive method e.g. makes it possible to establish whether, in undesired manner, there is a double plate, a multiple plate or a faulty or erroneous plate. If the measured number of plates does not correspond to the desired plate number, then the further conveying of the plates and/or the operation of the forming plant can be automatically stopped.

According to the invention, a particularly reliable and economic plate number detection can be ensured in that the sensor elements are acoustic sensor elements, particularly ultrasonic sensor elements. This constitutes an independent inventive aspect. Fundamentally it is also possible for the sensor elements to e.g. be capacitive sensor elements, inductive sensor elements or optical sensor elements.

A particularly easily implementable signal processing can, according to the invention, occur where for determining the number of plates a transmission signal passing through the plate is used. In this case one of the two sensor elements emits a signal and the residual signal level remaining after signal passage through the plate element is determined by the other sensor element. Particularly in the case of an acoustic measurement it is advantageous that the two sensor elements during the determination of the plate number are located on either side of the flat sides of the plate and in particular roughly centrally on the plate. This makes it possible to reduce undesired diffraction effects on the plate edges.

It is advantageous for a particularly high measuring accuracy that the determination of the plate number is performed with the feeder stationary. This is particularly advantageous with acoustic measurements, because here a relative movement between the sensor elements and/or a relative movement of the plate with respect to the sensor elements can give rise to a signal invalidation. It is also possible to slowly move with respect to the second sensor element the feeder with the plate and the first sensor element during the determination of the number of plates, the relative speed appropriately being max 2.1 m/min. Preferably the plate number determination is activated with a stop instruction to the feeder or shortly thereafter.

Following plate number determination in the second position, the plate can be moved into the third position by the feeder and is then only there released. However, it is particularly preferred that the plate is released and deposited by the feeder at the second position. In this case plate number determination takes place when the plate is at the deposition point. Plate number determination can take place for as long as the plate is still held by the feeder. However, it is also possible when the plate has been released by the feeder in the second position.

If a double plate or a multiple plate is taken up by the feeder in the first position, there is the risk of the additional plate becoming detached and dropping during feeder movement and/or of laterally moving with respect to the other plate. This can in particular take place during the deceleration of the feeder due to the mass moment of inertia of the additional plate. The possibility exists for the additional plate to come to rest outside the detection range of the two sensor elements. Against this background it is advantageous for further increasing operating reliability and safety for there to be at least one further, particularly acoustic sensor element laterally displaced relative to the second position for the detection of unintentionally present plates. The further sensor element can e.g. also be constructed inductively, capacitively or optically.

For the detection of unintentionally present plates, it is e.g. possible to provide sensor element pairs with individual sensor elements in fixed mutual arrangement. However, it is particularly advantageous that, in particular following the release of the plate, the feeder is so moved that the first sensor element arranged at the feeder passes with the further sensor element into a signal-based arrangement, in which on the basis of a measurement signal transmitted between the first sensor element and the further sensor element, an unintentionally present plate can be detected. For the detection of unintentionally present plates, in this embodiment it is only necessary to have a single additional sensor element, which cooperates on a measurement basis with the first sensor element located at the feeder. It is in particular possible, following the release of the plate, not to move the feeder back immediately to the first position and instead initially move it to the second sensor element to check whether between the sensor element located at the feeder and the further sensor element there is an unintentionally present plate. This embodiment counteracts the possibility of the feeder or a plate dropping from the feeder striking and damaging a sensor element. For the detection of unintentionally present plates it is also possible for there to be at least one additional sensor element at the feeder.

The inventive method is characterized in that a sensor is provided for determining the number of plates present at the feeder and/or at the second position, the sensor having a first sensor element, which is arranged with the feeder is movably located at said feeder, as well as a second sensor element located in the second position.

The inventive device can in particular be used for implementing the inventive method, so that the advantages described in this connection can be obtained.

For a particularly economic and reliable plate number determination, it is advantageous that the sensor is an acoustic sensor, particularly an ultrasonic sensor. However, it can also be constructed as a capacitive sensor, inductive sensor or optical sensor.

It is also advantageous according to the invention that the second sensor element located in the second position is a transmitter and the first sensor element located at the feeder is a receiver. This is particularly appropriate if the sensor is an acoustic sensor, because then the receiver is frequently more sensitive to contamination than the transmitter. If the receiver is positioned above the conveyed plates on the feeder, the risk of the dirt particles passing from the plates to the receiver can be reduced. In addition, as a result of the movement of the feeder together with the receiver, a cleaning function also occurs at the receiver.

Preferably the two sensor elements are positioned in such a way that during a feeder deposition position they are superimposed with an interposed plate. The term deposition position is understood to mean a position in which the feeder releases the plate taken up. The deposition position can in particular be at the second position.

The plate with the device can be directly transferred into the working area of the working or forming plant. In this case the second position can be in the working area of the forming plant. However, according to the invention, it is advantageous for the second position to be located at a feed path for the further conveying of the plate into the forming plant. In this case the plate is not directly deposited in the working area of the forming plant and instead on an additional feed path taking over the further conveying of the plate into the working area.

The forming plant can e.g. be a punch, a press and/or a bending machine.

It is particularly appropriate, particularly at the feed path, to provide at least one further sensor element for the detection of unintentionally lost plates. This makes it possible to avoid, that additional plates which, in certain circumstances drop onto the feed path during feeder movement and which cannot be detected by the first and second sensor elements are conveyed with the feed path into the working area of the forming plant. It is in particular possible, following the deposition of the plate in the manner explained in conjunction with the inventive method, to move the feeder with the first sensor element to the further sensor element, in order to then carry out a measurement for detecting unintentionally present plates between the first and the further sensor elements. The at least one sensor element can e.g. also be located at the feeder.

A constructionally particularly simple and economic device can be obtained according to the invention in that the feeder has a suction gripper. Such a suction gripper can e.g. have suction cups operating on a vacuum basis. Additionally or alternatively the feeder can e.g. have magnetic grippers and/or a mechanical gripper.

Figure 2:
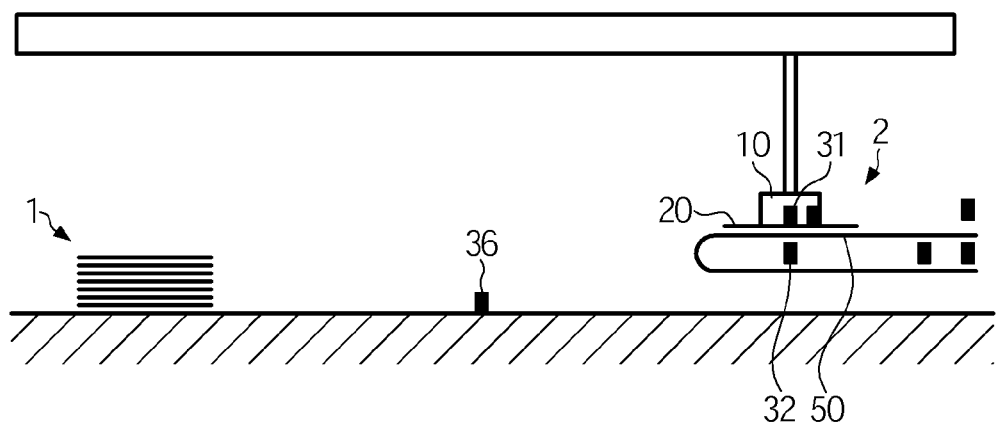
Figure 3:
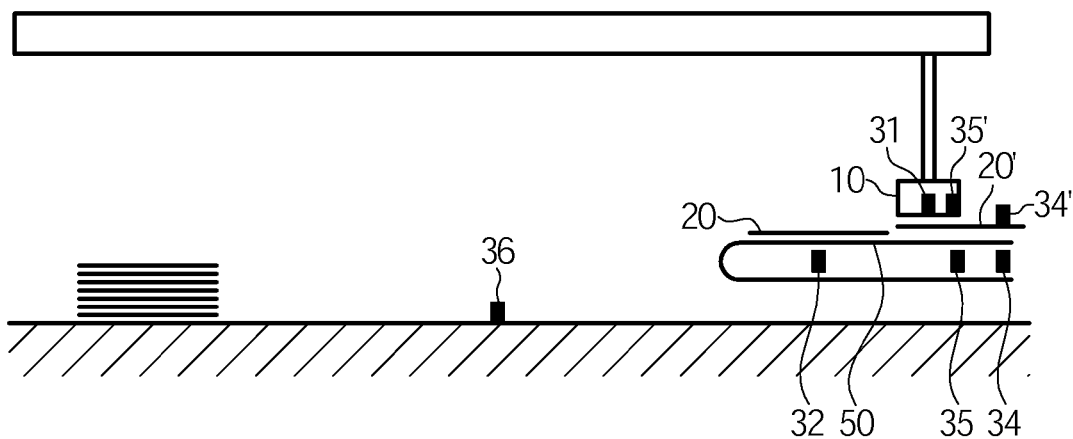

The invention is described in greater detail hereinafter relative to preferred embodiments which are illustrated in the attached diagrammatic drawings, wherein show:

FIGS. 1 to 3 An embodiment of an inventive device in different stages of the implementation of the inventive method.

Figure 4:
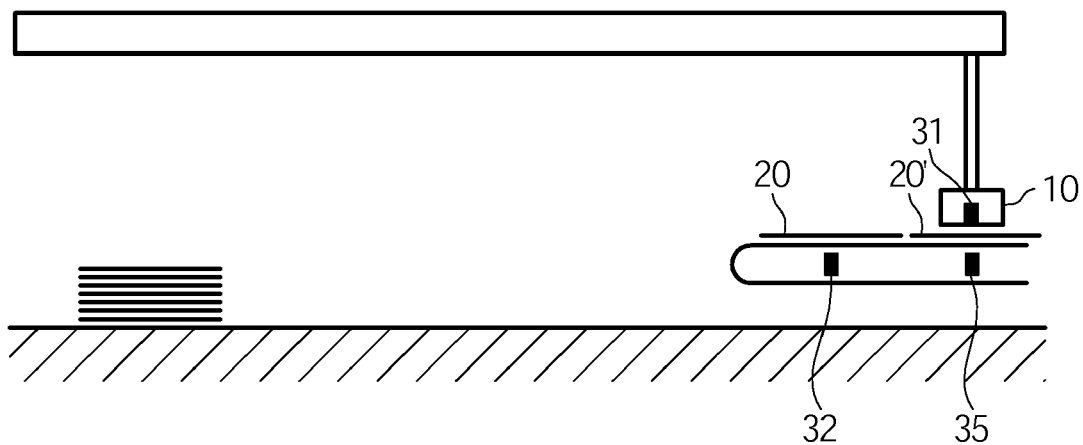

FIG. 4 Another embodiment of an inventive device during the detection of dropped plates.

A device according to the invention is shown in FIGS. 1 to 3. The device is used for conveying sheet metal plates 20 from a plate stack 22 in a first position 1 to a second position 2 at a feed path 50 of a cold forming or working plant. The cold forming plant can e.g. have a punch, a press and/or a bending machine.

For the movement of the plates 20, the device has a feeder 10. In the method stage shown in FIG. 1 said feeder 10 is located above the plate stack 22 in the first position. There the feeder 10, which can e.g. have a suction gripper, takes up a plate 20 and conveys it roughly two to three metres to the forming process taking place in the second position 2, as shown in FIG. 2. Plate 20 is then released by the feeder 10, is unloaded onto the feed path 50 constructed as a conveyor belt and conveyed on to the forming tool.

In certain circumstances, e.g. as a result of adhesive forces between superimposed plates 20, it is possible for two or more plates 20 to adhere to one another when being taken up from the plate stack 22. To prevent such a plate stack being supplied to the forming process, in the case of the device according to the invention two acoustic sensor elements 31 and 32 are provided. Sensor element 32, constructed as an ultrasonic transmitter, is fixedly mounted directly below the unloading point at the second position 2. Sensor element 31, constructed as an ultrasonic receiver, is mounted on the moving feeder 10. It is so positioned that at the time of the deposition of plate 20 in the second position 2 it is located precisely over sensor element 32. As in general terms the feeder 10 is stopped during deposition, this arrangement of the sensor elements 31, 32 permits a detection of double or multiple plates with the feeder stationary. If a double or multiple plate arrangement is detected, the device can be automatically stopped.

The sensor arrangement is particularly suitable for detecting plate thicknesses up to 2.5 mm.

Between first position 1 and second position 2 along the conveying path of feeder 10 is provided a further sensor element 36, which can e.g. be constructed as an inductive sensor element. Said further sensor element 36 serves to detect double or multiple plates which have dropped during conveying.

A dropping from feeder 10 of double or multiple plates can in particular arise when the feeder 10 is decelerated in the second position 2. In this case the dropped plates, carrying the reference numeral 20' in FIG. 3, can come to rest on the feed path 50 between the second position 2 and the forming tool. For the detection of such dropped plates 20' a plurality of further sensors 34, 34', 35, 35' is provided.

The sensors 34, 34' in the form of ultrasonic sensors are firmly installed between the second position 2 and the forming area on feed path 50. This makes it possible to ensure that the relative speed of plate 20' and sensor elements 34, 34' during the measurement is zero.

Additionally or alternatively a further pair of sensor elements 35, 35' can be provided. The first sensor element 35 is arranged in fixed manner behind the deposition area on feed path 50, whereas the second, further sensor element 35' is located at feeder 10, so that it travels with the latter. Through the movement of feeder 10, following the deposition of the plate 20, the sensor elements 35 and 35' can be superimposed for detecting a dropped plate 20'. This state is shown in FIG. 3. Through the provision of sensor element 35' at feeder 10, it is possible to avoid that the feeder 10 strikes said sensor element 35'. Thus, sensor element 35' is secure, even in the case of a longer movement path of feeder 10.

In the case of sensor element 35, it can e.g. be a receiver, and sensor element 35' is a transmitter. However, a reverse arrangement is also possible.

Another embodiment of an inventive device is shown in FIG. 4. The embodiment of FIG. 4 differs from that of FIGS. 1 to 3 in that in the case of the embodiment of FIG. 4 for the detection of dropped plates 20' coming to rest at feed path 50, no additional sensor element 35' is provided on feeder 10. Instead, for the detection of said dropped plates 20', use can be made of the first sensor element 31 as is also used for multiple plate detection during the deposition of plate 20 and which is positioned above the second sensor element 32. Following the deposition of plate 20, for the detection of dropped plates 20' the feeder 10 is moved on, so that the first sensor element 31 at feeder 10 is positioned above the further sensor element 35. A plate thickness determination can now be performed between sensor elements 31 and 35 and as a result the dropped plate 20' can be detected. In the case of such an arrangement the number of sensor elements required is reduced.

The invention claimed is:

1. Method for the monitored conveying of plates,
in which a plate is taken up by a feeder from a first position and the plate with the feeder is moved to a second position,
wherein
during the movement of the feeder to the second position a first sensor element located at the feeder, as well as a second sensor element located in the second position are brought into a signal-based arrangement and that on the basis of a measurement signal transmitted between the sensor elements the number of plates at at least one of the feeder and the second position is determined.

2. Method according to claim 1,
wherein
the sensor elements are acoustic sensor elements.

3. Method according to claim 1,
wherein
the sensor elements are ultrasonic sensor elements.

4. Method according to claim 1,
wherein
a transmission signal which has passed through the plate is used for determining the number of plates.

5. Method according to claim 1,
wherein
the plate number determination takes place with the feeder stationary.

6. Method according to claim 1,
wherein
in the second position the plate is released and deposited by feeder.

7. Method according to claim 1,
wherein
there is at least one further sensor element for the detection of unintentionally present plates in a laterally displaced manner with respect to the second position.

8. Method according to claim 1,
wherein
there is at least one further acoustic sensor element for the detection of unintentionally present plates in a laterally displaced manner with respect to the second position.

9. Method according to claim 7,
wherein,
the feeder is moved in such a way that the first sensor element located at the feeder passes into a signal-based arrangement with the further sensor element, in which on the basis of a measurement signal transmitted between the first sensor element and the further sensor element an unintentionally present plate can be detected.

10. Method according to claim 7,
wherein,
following the release of the plate, the feeder is moved in such a way that the first sensor element located at the feeder passes into a signal-based arrangement with the further sensor element, in which on the basis of a measurement signal transmitted between the first sensor element and the further sensor element an unintentionally present plate can be detected.

11. Device for the monitored conveying of plates,
with a movable feeder, by means of which a plate can be conveyed from a first position to a second position and can preferably be deposited there,
wherein
a sensor is provided for determining the number of plates at least one of the feeder and the second position, said sensor having a first sensor element movably arranged with the feeder at the feeder, as well as a second sensor element located at the second position.

12. Device according to claim 11,
wherein
the sensor is an acoustic sensor.

13. Device according to claim 11,
wherein
the sensor is an ultrasonic sensor.

14. Device according to claim 11,
wherein
the second sensor element located in the second position is a transmitter and that the first sensor element located at the feeder is a receiver.

15. Device according to claim 11,
wherein
the two sensor elements are so positioned that they are located above one another with the plate between them in a deposition position of the feeder.

16. Device according to claim 11,
wherein
the second position is located at a feed path for further conveying plate into the forming plant.

17. Device according to claim 16,
wherein
there is at least one further sensor element at the feed path for detecting unintentionally present plates.

18. Device according to claim 11,
wherein
the feeder has a suction gripper.

19. Method for the monitored conveying of plates into a working or forming plant, in which a plate is taken up by a feeder from a first position and the plate with the feeder is moved to a second position,
wherein
during the movement of the feeder to the second position a first sensor element located at the feeder, as well as a second sensor element located in the second position are brought into a signal-based arrangement and that on the basis of a measurement signal transmitted between the sensor elements the number of plates at at least one of the feeder and the second position is determined.

20. Device for the monitored conveying of plates into a working or forming plant, with a movable feeder, by means of which a plate can be conveyed from a first position to a second position and can preferably be deposited there,
wherein
a sensor is provided for determining the number of plates at least one of the feeder and the second position, said sensor having a first sensor element movably arranged with the feeder at the feeder, as well as a second sensor element located at the second position.

* * * * *